(12) United States Patent
Kusano et al.

(10) Patent No.: US 11,761,401 B2
(45) Date of Patent: Sep. 19, 2023

(54) CYLINDER BLOCK AND INTERNAL COMBUSTION ENGINE PROVIDED WITH SAME

(71) Applicant: NISSAN MOTOR CO., LTD., Yokohama (JP)

(72) Inventors: Masamichi Kusano, Nagoya (JP); Koichi Tokura, Nagoya (JP); Shinji Kitamura, Nagoya (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 1076 days.

(21) Appl. No.: 16/089,337

(22) PCT Filed: Mar. 31, 2017

(86) PCT No.: PCT/JP2017/013522
§ 371 (c)(1),
(2) Date: Sep. 27, 2018

(87) PCT Pub. No.: WO2017/175670
PCT Pub. Date: Oct. 12, 2017

(65) Prior Publication Data
US 2019/0112999 A1 Apr. 18, 2019

(30) Foreign Application Priority Data
Apr. 7, 2016 (JP) ................... 2016-077365

(51) Int. Cl.
*F02F 7/00* (2006.01)
*F16C 9/02* (2006.01)
*F16C 17/02* (2006.01)

(52) U.S. Cl.
CPC ............ *F02F 7/0021* (2013.01); *F02F 7/00* (2013.01); *F02F 7/0053* (2013.01);
(Continued)

(58) Field of Classification Search
CPC .......... F02F 7/00; F02F 7/0002; F02F 7/0021; F02F 7/0053; F02F 7/0065; F02F 7/0095; F16C 17/02; F16C 9/02
See application file for complete search history.

(56) References Cited

U.S. PATENT DOCUMENTS

| 1,561,745 A * | 11/1925 | Redfield | .................. F16C 9/02 184/13.1 |
| 2011/0013862 A1* | 1/2011 | Nakamure | ............ F02F 7/0053 384/457 |
| 2017/0284335 A1* | 10/2017 | Suzuki | .................. F02F 7/0021 |

FOREIGN PATENT DOCUMENTS

| JP | S62-102019 U | 6/1987 |
| JP | H02-137548 U | 11/1990 |

(Continued)

OTHER PUBLICATIONS

International Search Report in PCT/JP2017/013522 dated Jun. 20, 2017.

*Primary Examiner* — Grant Moubry
*Assistant Examiner* — Ruben Picon-Feliciano
(74) *Attorney, Agent, or Firm* — Foley & Lardner LLP (57) ABSTRACT

A cylinder block includes a support wall part that rotatably supports a crank shaft. The support wall part has a fitting recess part to which a bearing cap can be fitted. In each of the left and right corner parts where a bottom surface and a fitting surface of the fitting recess part intersect, a notch groove is formed that extends in the array direction of cylinder bores and has a substantially arc-shaped cross section when cut by the virtual plane along the extension direction thereof. As a result, stress having a greater value as the location becomes closer to the center part in the extension direction of the notch groove can be substantially uniform in the extension direction of said notch groove, and it is possible to effectively mitigate the stress concentration.

9 Claims, 9 Drawing Sheets

(52) U.S. Cl.
CPC .............. *F02F 7/0065* (2013.01); *F16C 9/02* (2013.01); *F16C 17/02* (2013.01); *F02F 7/0002* (2013.01); *F02F 7/0095* (2013.01)

(56) References Cited

FOREIGN PATENT DOCUMENTS

| | | |
|---|---|---|
| JP | H03-062217 U | 6/1991 |
| JP | 2006-242150 A | 9/2006 |
| JP | 2010-210036 A | 9/2010 |
| JP | 2012-127433 A | 7/2012 |

* cited by examiner

CYLINDER BLOCK AND INTERNAL COMBUSTION ENGINE PROVIDED WITH SAME

CROSS-REFERENCE TO RELATED APPLICATIONS

This application is a national stage application of PCT/JP2017/013522, which claims priority to Japanese Patent Application No. JP 2016-077365, filed in the Japan Patent Office on Apr. 7, 2016, the contents of each of which are hereby incorporated herein by reference.

BACKGROUND

Technical Field

The present invention relates to a cylinder block that comprises a bearing body having a fitting recess part to which a bearing cap can be fitted, and a bearing part formed in the bottom surface of that fitting recess part, and is configured so as to axially support a crank shaft between that bearing body and the bearing cap in a rotatable fashion, and to an internal combustion engine comprising said cylinder block.

Background Art

In Unexamined Utility Model Publication No. S62-102019, noted is a cylinder block that comprises a bearing body and another half-split type bearing part. The bearing body has a fitting recess part to which a bearing cap having a half-split type bearing part can be fitted. The other half-split type bearing part is formed in the bottom surface of that fitting recess part. The cylinder block is configured so as to axially support that crank shaft in a rotatable fashion, by sandwiching a journal part of the crank shaft between that bearing body and the bearing cap.

In that cylinder block, a recess groove is formed in the corner part of the fitting recess part of the bearing body. The recess groove is substantially semicircular when viewed from the axial direction of the crank shaft. The corner part of the fitting recess part is abutted by the corner part of the bearing cap. Thereby, an attempt is made to mitigate stress concentration that occurs in the corner part of the fitting recess part of that bearing body due to reactive force of the combustion pressure acting on the bearing body via the crank shaft and the bearing cap.

SUMMARY

However, as a result of the inventors performing earnest research regarding the stress that occurs in the corner part of the fitting recess part of the bearing body, it was determined that the magnitude of the stress that occurs in the corner part of the fitting recess part of the bearing body differs in the axial direction of the crank shaft. It was also perceived that it is not possible to sufficiently mitigate the stress concentration that occurs in that corner part only by simply forming a recess groove in the corner part of the fitting recess part of the bearing body such as with the cylinder block noted in the publication described above.

The present invention was made considering the above, and its objective is to provide technology that can sufficiently mitigate stress concentration acting on the corner part of the fitting recess part of the bearing body to further improve the durability of the cylinder block.

The cylinder block of the present invention and the internal combustion engine comprising said cylinder block adopt the following means to achieve the objective described above.

With a preferred aspect of the cylinder block of the present invention, the cylinder block comprises a bearing body having a fitting recess part to which a bearing cap can be fitted, and a bearing part formed in the bottom surface of said fitting recess part. The cylinder block is configured so as to axially support a crank shaft between the bearing body and the bearing cap in a rotatable fashion. The fitting recess part of the bearing body has a bottom surface corner part abutted by a corner part of the bearing cap. Also, in the bottom surface corner part, formed is a recess groove having a substantially arched shape when seen from the axial direction of the crank shaft and extending in the axial direction of the crank shaft. Also, the recess groove has different depths, in the extension direction of that recess groove, in accordance with the magnitude of the stress acting on that recess groove.

With the present invention, the recess groove provided in the bottom surface corner part of the fitting recess part of the bearing body has different depths, in the extension direction of that recess groove, in accordance with the magnitude of the stress acting on that recess groove. In other words, the recess groove is formed such that the depth thereof is deeper in the location where greater stress occurs. Thereby, it is possible to achieve satisfactory and sufficient mitigation of stress concentration that occurs in the bottom surface corner part of the fitting recess part of that bearing body due to reaction force of the combustion pressure acting on the bearing body via the crank shaft and the bearing cap.

With another aspect of the cylinder block of the present invention, the recess groove is formed so as to be deepest at the substantially center part thereof in the extension direction of the recess groove.

As a result of earnest research regarding stress that occurs in the corner part of the fitting recess part of the bearing body, the inventors found that the stress that occurs in the bottom surface corner part of the fitting recess part of the bearing body is highest at the substantially center part in the extension direction of the recess groove. With this aspect, the depth of the recess groove is deepest at the substantially center part in the extension direction of the recess groove, where the stress that occurs in the bottom surface corner part of the fitting recess part of the bearing body is highest. Thereby, it is possible to effectively mitigate the stress concentration that occurs in the bottom surface corner part.

With another aspect of the cylinder block of the present invention, the recess groove is formed such that the depth thereof gradually increases from both end parts in the extension direction of that recess groove towards the substantially center part in the extension direction of that recess groove.

With this aspect, there are not sudden changes in the depth of the recess groove along the extension direction of the recess groove. Thereby, it is possible to effectively avoid stress concentration due to shape changes that occur in accordance with sudden changes in depth.

With another aspect of the cylinder block of the present invention, the recess groove is formed such that, when that recess groove is cut by a virtual plane that includes a virtual connection line connecting points at which the depth of that recess groove is the deepest, the cross-sectional shape of the recess groove has a substantially arched shape.

With this aspect, it is possible to achieve a smooth change in depth along the extension direction of the recess groove.

Thereby, it is possible to more effectively avoid stress concentration due to shape changes that occur in accordance with changes in depth.

With another aspect of the cylinder block of the present invention having the recess groove with the substantially arc-shaped cross section, the recess groove has been formed by machining using a disk-shaped cutting tool. Also, the cross-sectional shape of the recess groove has been formed by the shape of the cutting tool being transferred.

With this aspect, machining of the recess groove with a disk-shaped cutting tool is just required. Thus, it is possible to easily ensure the recess groove with the substantially arc-shaped cross section.

A preferred aspect of an internal combustion engine of the present invention comprises: the cylinder block according to any of the aspects described above having a cylinder bore; a cylinder head fastened to that cylinder block; a bearing cap fastened to the bearing body of the cylinder block; a crank shaft rotatably supported between the bearing body and the bearing cap; and a piston configured so as to be connected to that crank shaft and also to slide inside the cylinder bore. A combustion chamber is formed by the cylinder bore, the cylinder head, and the piston. Also, the internal combustion engine is configured such that the piston is made to move back and forth by combustion pressure generated in the combustion chamber, and configured to output power by converting the back and forth movement of that piston to rotational movement of the crank shaft.

With the present invention, the configuration comprises the cylinder block of the present invention of any of the aspects described above. Thereby, it is possible to exhibit the same effects as the effects exhibited by the cylinder block of the present invention, i.e. the effect of being able to further improve the durability of the cylinder block, for example. As a result, it is possible to improve the quality of the internal combustion engine.

With another aspect of the internal combustion engine of the present invention, the cylinder block has a plurality of the bearing bodies. Also, the crank shaft has a plurality of journal parts supported by the plurality of the bearing bodies, respectively, at least one disk-shaped inertial body configured to stabilize the rotation of the crank shaft, and at least one weight member configured to correct the rotation unbalance of the crank shaft. Also, the journal parts include a first journal part to which the weight members are disposed at both end parts in the axial direction of that journal part. Also, the plurality of the bearing bodies include a first bearing body that supports the first journal part. Also, the recess groove is formed in the bottom surface corner part of the fitting recess part in at least the first bearing body.

Here, typically, a counter weight formed integrally with the crank arm that connects the crank journal and the crank pin corresponds to the "weight member" of the present invention. Also, typically, a fly wheel or drive plate corresponds to the "disk-shaped inertial body" of the present invention.

With this aspect, the recess groove is formed in the bottom surface corner part of the fitting recess part in the first bearing body on which, in addition to combustion pressure, the inertial force of two weight members acts via the first journal part. Thereby, it is possible to rationally and effectively mitigate the stress concentration.

With another aspect of the internal combustion engine of the present invention, the cylinder block has a plurality of the bearing bodies. Also, the crank shaft has a plurality of journal parts respectively supported by the plurality of the bearing bodies, at least one disk-shaped inertial body configured to stabilize the rotation of the crank shaft, and at least one weight member configured to correct the rotation unbalance of the crank shaft. Also, the journal parts include a second journal part to which the weight member is disposed at one end part in the axial direction of that journal part, and the disk-shaped inertial body is disposed at the other end part in the axial direction of that journal part. Also, the plurality of the bearing bodies include a second bearing body that supports the second journal part. Also, the recess groove is formed in the bottom surface corner part of the fitting recess part in at least the second bearing body.

Here, typically, a counter weight formed integrally with the crank arm that connects the crank journal and the crank pin corresponds to the "weight member" of the present invention. Also, typically, a fly wheel or drive plate corresponds to the "disk-shaped inertial body" of the present invention.

With the present invention, the recess groove is formed in the bottom surface corner part of the fitting recess part in the second bearing body on which, in addition to combustion pressure, the inertial force of the weight member and the gravity of the disk-shaped inertial body act via the second journal part. Thereby, it is possible to rationally and effectively mitigate stress concentration.

With the present invention, it is possible to provide technology that can further improve the durability of the cylinder block.

BRIEF DESCRIPTION OF DRAWINGS

Referring now to the attached drawings which form a part of this original disclosure.

DESCRIPTION OF EMBODIMENTS

Next, a preferred embodiment of the present invention is explained.

Figure 1:
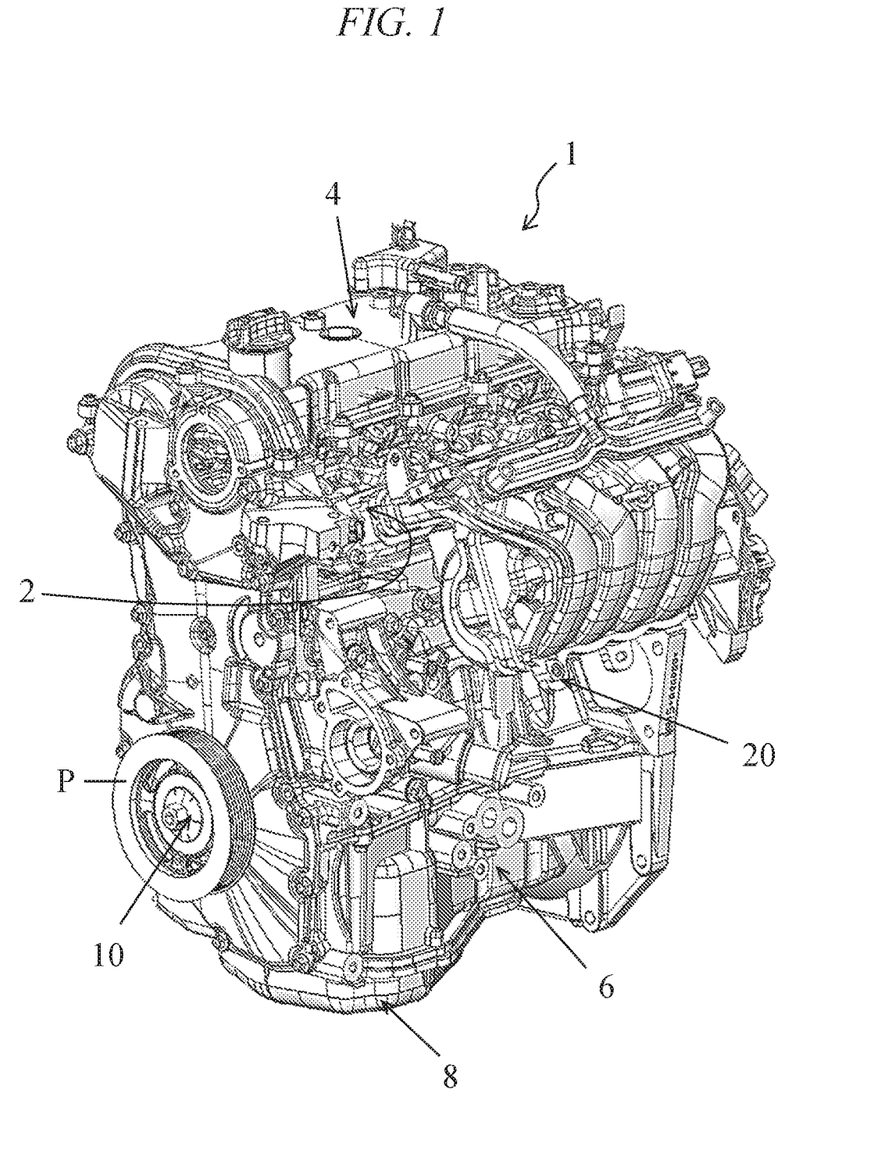
FIG. 1 is a block diagram showing an overview of the configuration of an internal combustion engine 1 according to an embodiment of the present invention.

As shown in FIG. 1, an internal combustion engine 1 according to an embodiment of the present invention comprises: a cylinder head 2; a rocker cover 4 attached to the top part of that cylinder head 2; a cylinder block 20 according to the embodiment of the present invention that is attached to the bottom part of the cylinder head 2; an upper oil pan 6 attached to the bottom part of that cylinder block 20; a lower oil pan 8 attached to the bottom part of that upper oil pan 6; and a crank shaft 10 rotatably supported by the cylinder block 20.

Figure 2:
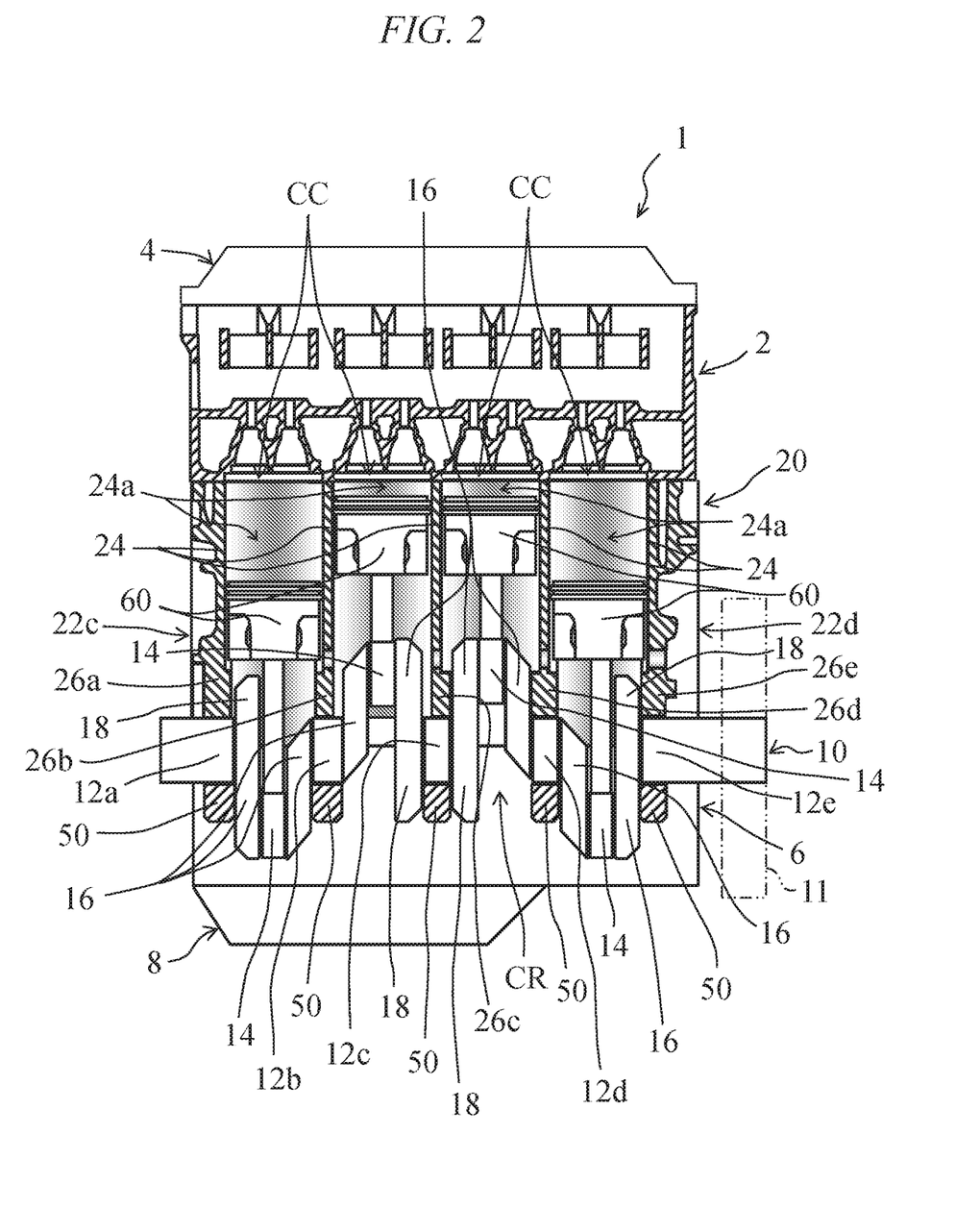
FIG. 2 is a cross section diagram showing an overview of the internal configuration of the internal combustion engine 1 according to the embodiment of the present invention.

In the present embodiment, as shown in FIG. 2, the internal combustion engine 1 is configured as an in-line four cylinder engine in which four cylinders are arranged in series. The internal combustion engine 1 is configured such that a piston 60 is moved back and forth inside a cylinder bore 24a by combustion pressure generated in a combustion chamber CC which is formed by a cylinder head 2, and the cylinder bore 24a and the piston 60 described later, and configured to output power by converting the back and forth movement of the piston 60 to rotational movement of a crank shaft 10.

Figure 3:
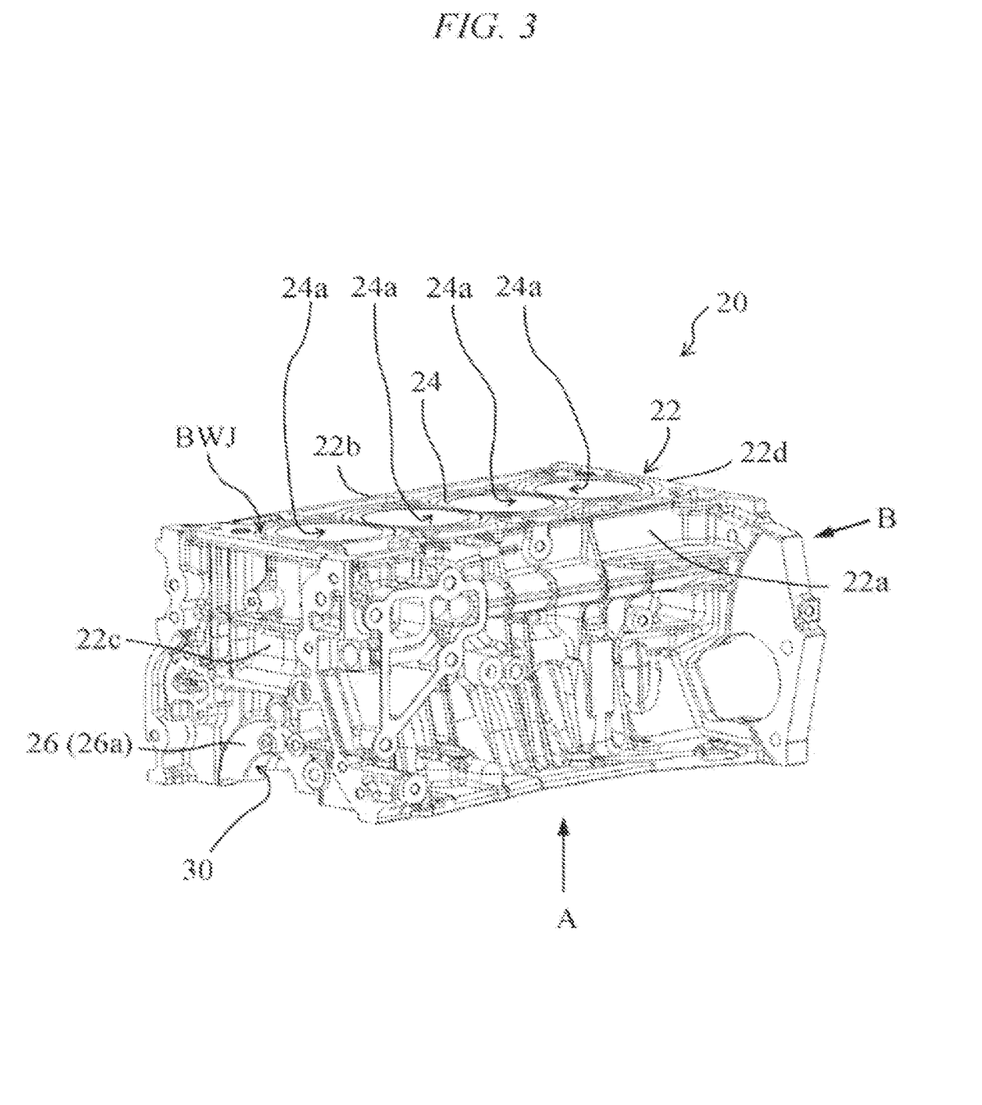
FIG. 3 is a perspective view showing an overview of the configuration of a cylinder block 20 according to the embodiment of the present invention.

As shown in FIG. 3, the cylinder block 20 comprises an outer wall part 22 forming the outline of the cylinder block 20, a cylinder bore wall part 24 having four cylinder bores 24a, and a support wall part 26 that rotatably supports the crank shaft 10. A block water jacket BWJ is formed between the outer wall part 22 and the cylinder bore wall part 24.

As shown in FIG. 3, the cylinder bore wall 24 is configured such that four cylinder bores 24a are arranged in series to form a Siamese cylinder in which the mutually adjacent cylinder bore wall parts 24 are connected to each other. As shown in FIG. 2, the piston 60 slides inside the cylinder bore 24a.

Figure 4:
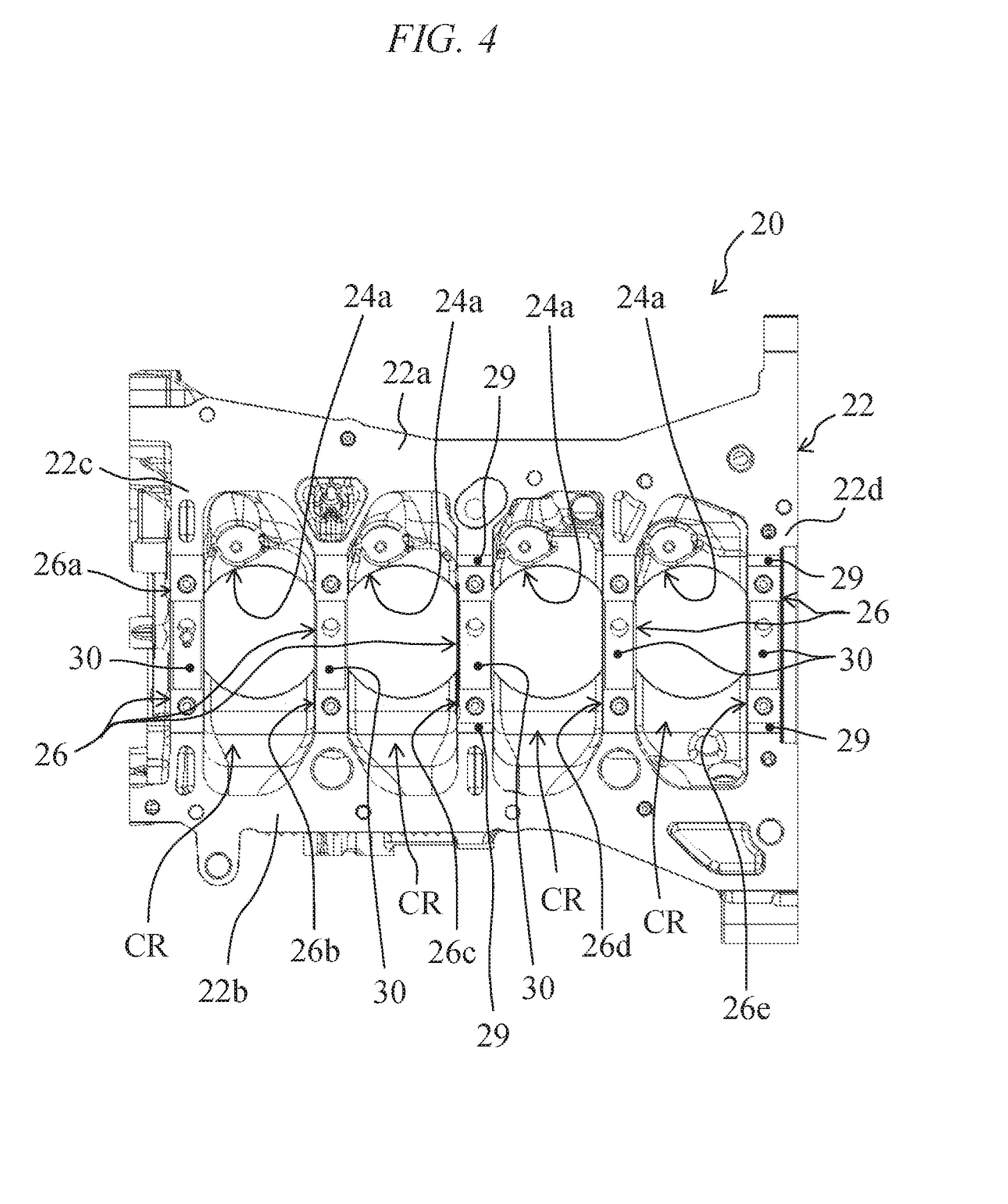
FIG. 4 is a plan view of the cylinder block 20 according to the embodiment of the present invention, when seen from the arrow A direction of FIG. 3.

As shown in FIG. 4, the support wall parts 26 connects both side walls 22a, 22b of the outer wall part 22 at the lower parts (lower parts in FIG. 3) thereof, each of the side walls 22a, 22b extending along the array direction of the cylinder bores 24a. Five support wall parts 26 are arranged in the array direction of the cylinder bores 24a so as to partition a crank chamber CR into the cylinder bores 24a. Among the support wall parts 26, two support wall parts 26 positioned at both ends in the array direction of the cylinder bores 24a are formed integrally with a front wall 22c and a back wall 22d of the outer wall part 22, each of the front and back walls 22c, 22d extending in the direction intersecting the array direction of the cylinder bores 24a. The support wall part 26 is an example of an implementation configuration corresponding to the "bearing body" of the present invention.

Here, for convenience of explanation, the support wall parts 26 are defined as a first support wall part 26a, a second support wall part 26b, a third support wall part 26c, a fourth support wall part 26d, and a fifth support wall part 26e in order from the left side in FIG. 4. Hereafter, the support wall part 26 will be also called the first support wall part 26a, the second support wall part 26b, the third support wall part 26c, the fourth support wall part 26d, or the fifth support wall part 26e as necessary. This is an example of an implementation configuration in which the third support wall part 26c corresponds to the "first bearing body" of the present invention, and the fifth support wall part 26e corresponds to the "second bearing body" of the present invention.

Figure 5:
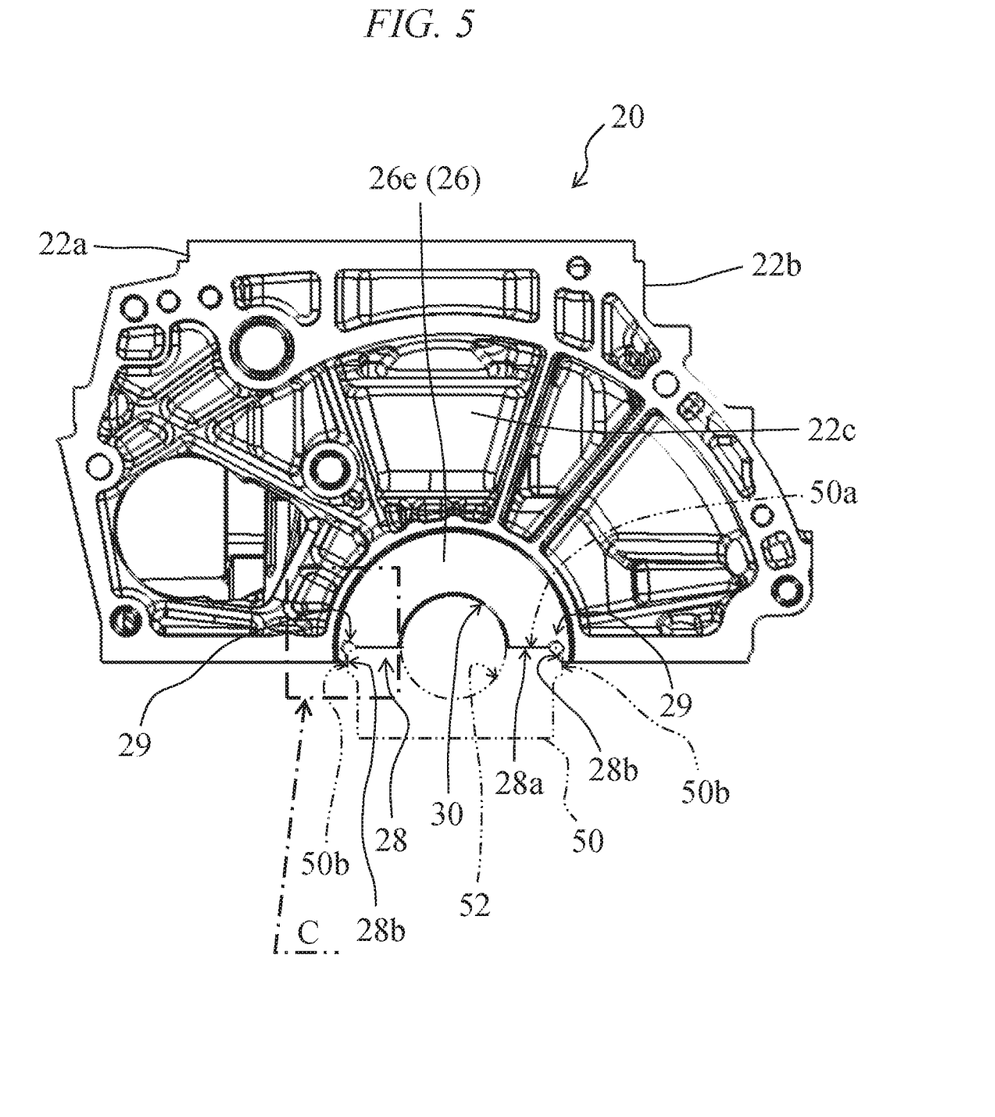
FIG. 5 is a front view of the cylinder block 20 according to the embodiment of the present invention, when seen from the arrow B direction of FIG. 3.
Figure 6:
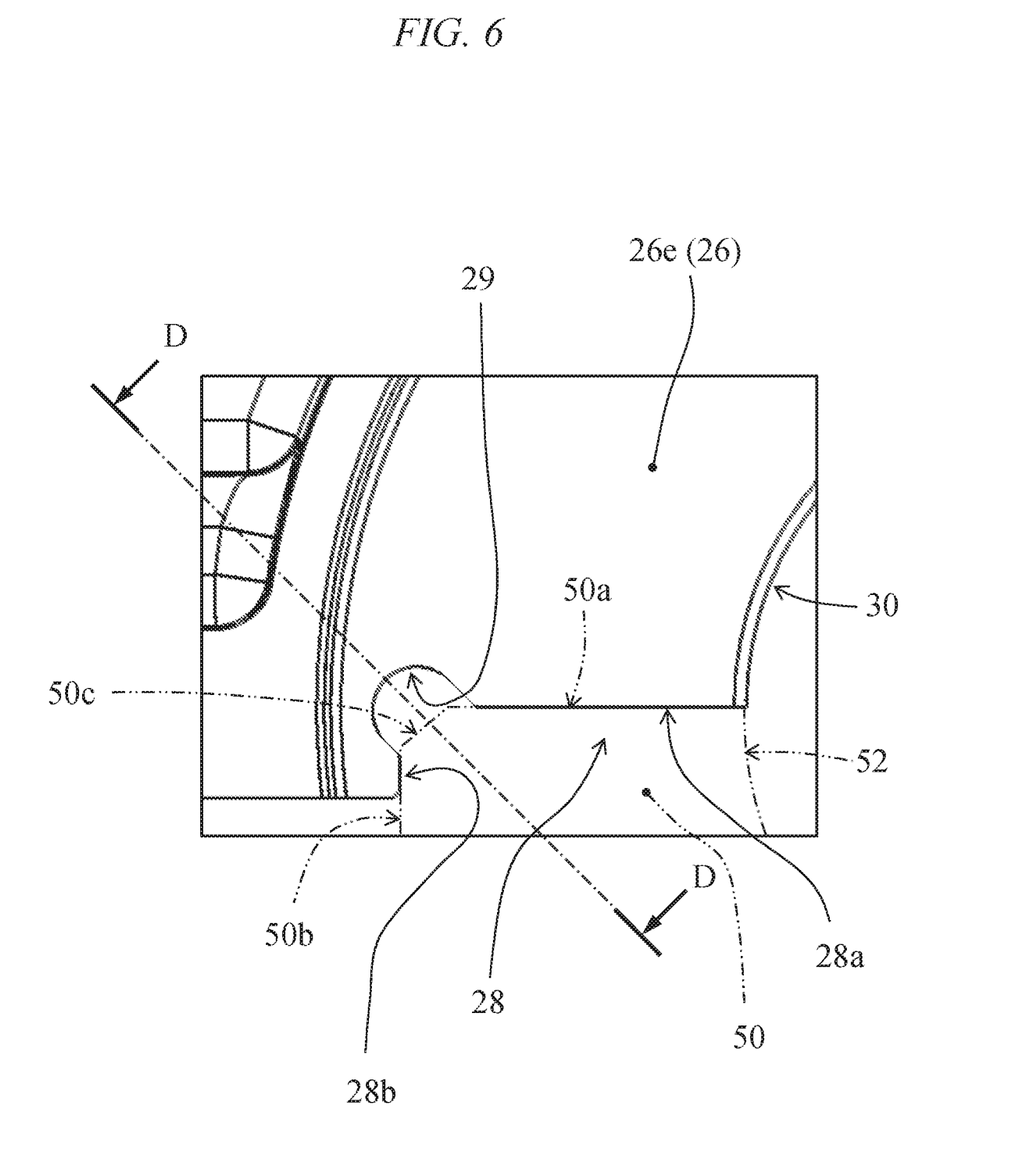
FIG. 6 is a main part enlarged view showing an enlarged view of the C part of FIG. 5.

As shown in FIG. 5 and FIG. 6, on each support wall part 26, a fitting recess part 28 is formed in which a bearing cap 50 is fitted. That fitting recess part 28 has a bottom surface 28a abutted by a top surface 50a of the bearing cap 50, and fitting surfaces 28b abutted by side surfaces 50b of the bearing cap 50. As shown in FIG. 5, a half-split type bearing part 30 is formed in the bottom surface 28a of the support wall part 26. In the bearing cap 50, a half-split type bearing part 52 is formed at a position facing the bearing part 30 of the support wall part 26. When the bearing cap 50 is fastened by a bolt (not illustrated) to the fitting recess part 28 of the support wall part 26, as shown in FIG. 5, a circular bearing is formed by the bearing parts 30, 52.

Also, as shown in FIG. 5 and FIG. 6, in each of the left and right (left and right in FIG. 5, both sides sandwiching the bearing part 30) corner parts of the third and fifth support wall parts 26c, 26e, where the bottom surface 28a and the fitting surface 28b of the fitting recess part 28 intersect, formed is a notch groove 29 with a substantially arched shape in the front view (when seen from the axial direction of the crank shaft 10, i.e. the direction perpendicular to the paper surface of FIG. 5 and FIG. 6). As shown in FIG. 6, direct abutting of a chamfer part 50c of the corner part of the bearing cap with the fitting recess part 28 is avoided by that notch groove 29. The notch groove 29 is an example of the implementation configuration corresponding to the "recess groove" of the present invention.

Figure 7:
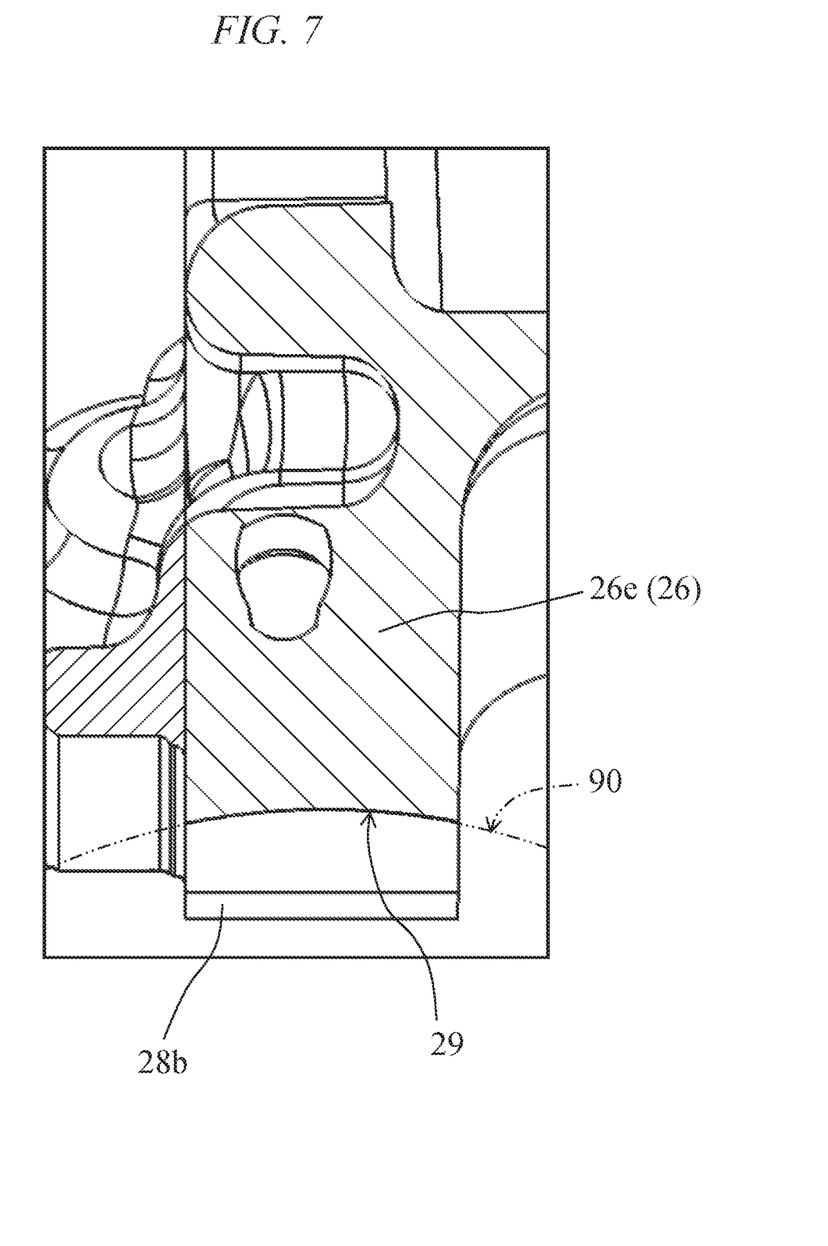
FIG. 7 is a cross section view showing the D-D cross section of FIG. 6.

As shown in FIG. 7, the notch groove 29 extends in the array direction of the cylinder bores 24a. In other words, the notch groove 29 is formed so as to pierce through the thickness direction (left and right direction in FIG. 7) of the third and fifth support wall parts 26c, 26e. The notch groove 29 is formed such that the depth is deepest at the substantially center part in the extension direction of the notch groove 29.

As shown in FIG. 7, when the notch groove 29 is cut by a virtual plane that includes a virtual connection line connecting the deepest points of the notch groove 29 when the notch groove 29 is seen from the extension direction along the extension direction of that notch groove 29, the cross-sectional shape of the notch groove 29 has a substantially arched shape. Here, as shown in FIG. 7, the notch groove 29 is formed by cutting (machining) using a disk-shaped cutter 90. At this time, the cross section is made to be substantially arc-shaped by the shape of that cutter 90 being transferred to the notch groove 29. The cutter 90 is an example of the implementation configuration corresponding to the "cutting tool" of the present invention.

As shown in FIG. 2, the crank shaft 10 is mainly configured from first to fifth crank journals 12a, 12b, 12c, 12d, 12e respectively supported by first to fifth support wall parts 26a, 26b, 26c, 26d, 26e, four crank pins 14 configured to rotatably support the pistons 60, crank arms 16 configured to connect the respective first to fifth crank journals 12a, 12b, 12c, 12d, 12e to each crank pin 14, and counter weights 18. The third and fifth crank journal parts are examples of the implementation configuration corresponding to the "first journal part" and the "second journal part" of the present invention, respectively. Also, the counter weight 18 is an example of the implementation configuration corresponding to the "weight member" of the present invention.

As shown in FIG. 2, both end parts in the axial direction of the crank shaft 10 project from the front wall 22c and the back wall 22d of the outer wall part 22. As shown in FIG. 1, a crank pulley P is attached to the axial direction end part of the crank shaft 10 on the front wall 22c side. As shown in FIG. 2, a fly wheel 11 is attached to the axial direction end part of the crank shaft 10 on the back wall 22d side. The fly wheel 11 is an example of an implementation configuration corresponding to the "disk-shaped inertial body" of the present invention.

As shown in FIG. 2, the counter weights 18 are formed integrally with the crank arm 16 connecting the first crank journal 12a and the crank pin 14, the two crank arms 16 connecting the third crank journal 12c and the crank pin 14, and the crank arm 16 connecting the fifth crank journal 12e and the crank pin 14, respectively. The counter weights 18 project in roughly the opposite directions to the offset directions of the crank pins 14 with respect to the first, third, and fifth crank journals 12*a*, 12*c*, 12*e*, respectively.

Next, the state of the stress that occurs in the notch groove 29 of the third and fifth support wall parts 26*c*, 26*e* in accordance with operation of the internal combustion engine 1 configured in this way is explained. When the internal combustion engine 1 according to the embodiment of the present invention is operated, a combustion explosion occurs by ignition of a fuel-air mixture of air and fuel inside the combustion chamber CC, and the pistons 60 perform back and forth linear motions inside the cylinder bores 24*a*, respectively. The back and forth linear motions of the pistons 60 are converted to rotational movement by the crank shaft 10.

Figure 8:
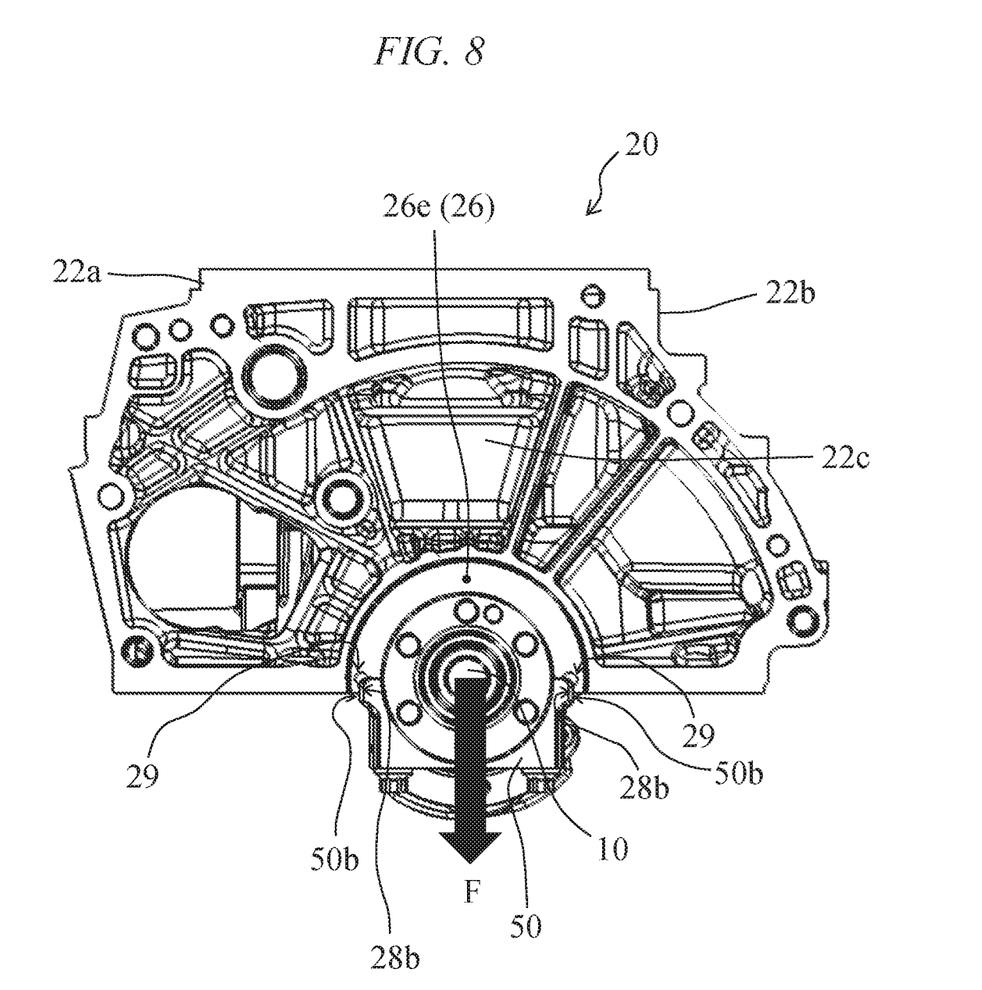
FIG. 8 is an explanatory drawing showing a state in which a crank shaft 10 is supported on the cylinder block 20 according to the embodiment of the present invention, when seen from the direction corresponding to the arrow B direction of FIG. 3.

Here, the combustion pressure due to the combustion explosion inside the combustion chamber CC acts on, via the piston 60 and the crank shaft 10, each bearing cap 50 as force in the separation direction of the bearing cap 50 from each support wall part 26 of the cylinder block 20 (see FIG. 8). In other words, the combustion pressure acts as tensile force (code F in FIG. 8) that pulls each support wall 26 downward (downward in FIG. 8).

Due to that tensile force, stress concentration occurs in each of the left and right (left and right in FIG. 5, both sides sandwiching the bearing part 30) corner parts of each support wall part 26, where the bottom surface 26*a* and the fitting surfaces 28*b* of the fitting recess part 28 intersect. However, at the third support wall part 26*c*, in addition to the combustion pressure described above, the inertial forces of two counter weights 18 act as tensile force pulling that third support wall part 26*c* downward (downward in FIG. 8). At the fifth support wall part 26*e*, in addition to the combustion pressure described above, the inertial force of one counter weight 18 and the gravity of the fly wheel 11 act as tensile force pulling that fifth support wall part 26*e* downward (downward in FIG. 8). Thus, the stress concentration that occurs in each of the left and right (left and right in FIG. 5, both sides sandwiching the bearing part 30) corner parts of the third and fifth support wall parts 26*c*, 26*e*, where the bottom surface 28*a* and the fitting surface 28*b* of the fitting recess part 28 intersect, becomes greater than the stress concentration that occurs in each of the left and right (left and right in FIG. 5, both sides sandwiching the bearing part 30) corner parts of the other support wall parts 26*a*, 26*b*, 26*d*, where the bottom surface 28*a* and the fitting surface 28*b* of the fitting recess part 28 intersect.

However, in the present embodiment, in each of the left and right (left and right in FIG. 5, both sides sandwiching the bearing part 30) corner parts of the third and fifth support wall parts 26*c*, 26*e*, where the bottom surface 28*a* and the fitting surface 28*b* of the fitting recess part 28 intersect, formed is the notch groove 29 with a substantially arched shape in the front view (when seen from the axial direction of the crank shaft 10, i.e. the direction perpendicular to the paper surface of FIG. 5 and FIG. 6). Thereby, it is possible to achieve satisfactory mitigation of the stress concentration that occurs in those corner parts.

Figure 9:
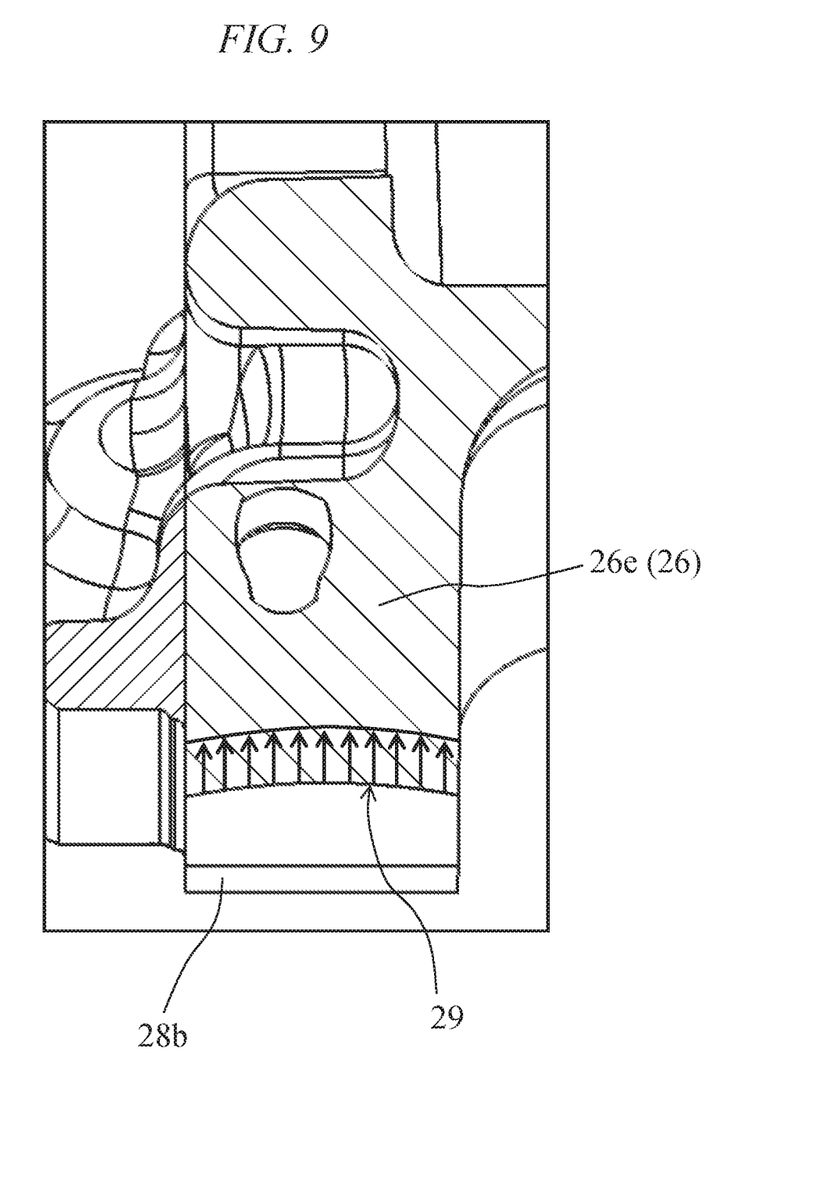
FIG. 9 is an explanatory drawing showing the state of the stress that acts on the recess groove 32 in the extension direction of the recess groove 32.

In addition, that notch groove 29 has a substantially arched shape so as to have the deepest depth at the substantially center part in the array direction of the cylinder bores 24*a*. Thus, so as shown in FIG. 9, it is possible to have the stress, the value of which becomes greater as the location becomes closer to the center part in the extension direction of the notch groove 29, substantially uniform in the extension direction of that notch groove 29, and possible to effectively mitigate the stress concentration.

In the present embodiment, the notch groove 29 with a substantially arched shape in the front view (when seen from the axial direction of the crank shaft 10, i.e. the direction perpendicular to the paper surface of FIG. 5 and FIG. 6) is formed in each of the left and right (left and right in FIG. 5, both sides sandwiching the bearing part 30) corner parts of the third and fifth support wall parts 26*c*, 26*e*, where the bottom surface 28*a* and the fitting surface 28*b* of the fitting recess part 28 intersect. However, the invention is not limited to this.

For example, the notch groove 29 with a substantially arched shape in the front view (when seen from the axial direction of the crank shaft 10, the direction perpendicular to the paper surface of FIG. 5 and FIG. 6) may be formed in the left and right (left and right in FIG. 5, both sides sandwiching the bearing part 30) corner parts of the first support wall part 26*a*, where the bottom surface 28*a* and the fitting surface 28*b* of the fitting recess part 28 intersect, in addition to those of the third and fifth support wall parts 26*c*, 26*c*.

In addition to the combustion pressure, the inertial force of one counter weight 18 acts on the first support wall part 26*a* as tensile force that pulls that first support wall part 26*a* downward (downward in FIG. 8). Thus, it is possible to achieve satisfactory mitigation of the stress concentration that occurs in that corner part.

A configuration may be employed in which the notch groove 29 with a substantially arched shape in the front view is formed only in each of the left and right corner parts of the third support wall part 26*c*. A configuration may also be employed in which the notch groove 29 with a substantially arched shape in the front view is formed only in each of the left and right corner parts of the fifth support wall part 26*e*. Alternatively, a configuration may be employed in which the notch groove 29 with a substantially arched shape in the front view is formed only in the corner part of any one of the other support wall parts 26*a*, 26*b*, 26*d*. Furthermore, a configuration may be employed in which the notch groove 29 with a substantially arched shape in the front view is formed in each of all the left and right corner parts of all the support wall parts 26*a*, 26*b*, 26*c*, 26*d*, 26*e*.

In the present embodiment, the notch groove 29 is configured so as to be deepest at the substantially center part in the array direction of the cylinder bores 24*a*. However, the invention is not limited to this. The depth of the notch groove 29 can be set suitably so as to be able to effectively mitigate the stress concentration in accordance with the level of stress concentration that occurs in the extension direction of the notch groove 29.

In the present embodiment, the notch groove 29 has a substantially arc-shaped cross section. However, the cross-sectional shape of the notch groove 29 is not limited to a substantially arched shape as long as it is possible to mitigate the stress concentration that occurs at different magnitudes in the extension direction of the notch groove 29, and thus may be formed in other shapes.

In the present embodiment, the fly wheel 11 is attached to the axial direction end part of the crank shaft 10 on the back wall 22*d* side. However, the invention is not limited to this. A configuration may also be employed in which a drive plate is attached to the axial direction end part of the crank shaft 10 on the back wall 22*d* side.

In the present embodiment, the notch groove 29 with a substantially arc-shaped cross section is formed by transferring the shape of the disk-shaped cutter 90. However, the invention is not limited to this. For example, the notch groove 29 with a substantially arc-shaped cross section may be formed by using an end mill.

The present embodiment shows one example of embodiments of the present invention. Therefore, the present invention is not limited to the configuration of the present embodiment. The corresponding relationship of each constitutional element of the present embodiment and each constitutional element of the present invention is shown hereafter.

The invention claimed is:

1. A cylinder block comprising:
a bearing body having a fitting recess part to which a bearing cap is fittable, and a bearing part formed in the bottom surface of the fitting recess part and configured so as to axially support a crank shaft between the bearing body and the bearing cap in a rotatable fashion, wherein:
the fitting recess part has a bottom surface corner part configured to be abutted by a corner part of the bearing cap;
at the bottom surface corner part, a recess groove extends through the bearing body in a thickness direction of the bearing body, which is parallel to an axial direction of the crank shaft; and
in a plane that is parallel to the thickness direction of the bearing body and extends through the recess groove, the recess groove has an arched shape and has a depth that is greatest at a center part of the bearing body in the thickness direction of the bearing body.

2. The cylinder block according to claim 1, wherein:
in said plane, the depth of the recess groove gradually increases from two opposite surfaces of the bearing body towards the center part.

3. An internal combustion engine, comprising:
the cylinder block according to claim 2, which has a cylinder bore;
a cylinder head fastened to the cylinder block;
a bearing cap fastened to the bearing body of the cylinder block;
a crank shaft supported between the bearing body and the bearing cap in a rotatable fashion; and
a piston connected to the crank shaft and configured to slide inside the cylinder bore; wherein:
a combustion chamber is formed by the cylinder bore, the cylinder head, and the piston; and
the internal combustion engine is configured such that the piston moves back and forth by combustion pressure generated in the combustion chamber, and the internal combustion engine is configured to output power by converting the back and forth movement of said piston to rotational movement of the crank shaft.

4. The cylinder block according to claim 1, wherein:
the arched shape corresponds to a shape of a cutting tool that cuts the bottom surface corner part to form the recess groove.

5. An internal combustion engine, comprising:
the cylinder block according to claim 4, which has a cylinder bore;
a cylinder head fastened to the cylinder block;
a bearing cap fastened to the bearing body of the cylinder block;
a crank shaft supported between the bearing body and the bearing cap in a rotatable fashion; and
a piston connected to the crank shaft and configured to slide inside the cylinder bore; wherein:
a combustion chamber is formed by the cylinder bore, the cylinder head, and the piston; and
the internal combustion engine is configured such that the piston moves back and forth by combustion pressure generated in the combustion chamber, and the internal combustion engine is configured to output power by converting the back and forth movement of the piston to rotational movement of the crank shaft.

6. An internal combustion engine, comprising:
the cylinder block according to claim 1, which has a cylinder bore;
a cylinder head fastened to the cylinder block;
a bearing cap fastened to the bearing body of the cylinder block;
a crank shaft supported between the bearing body and the bearing cap in a rotatable fashion; and
a piston connected to the crank shaft and configured to slide inside the cylinder bore; wherein:
a combustion chamber is formed by the cylinder bore, the cylinder head, and the piston; and
the internal combustion engine is configured such that the piston moves back and forth by combustion pressure generated in the combustion chamber, and the internal combustion engine is configured to output power by converting the back and forth movement of the piston to rotational movement of the crank shaft.

7. The internal combustion engine according to claim 6, wherein:
the cylinder block has a plurality of the bearing bodies;
the crank shaft comprises a plurality of journal parts respectively supported by the plurality of the bearing bodies, at least one disk-shaped inertial body configured to stabilize the rotation of the crank shaft, and at least one weight member configured to correct the rotation unbalance of the crank shaft;
the journal parts include a first journal part;
the at least one weight member includes a first weight member;
the first weight member is disposed at an end part of the first journal part in an axial direction of the first journal part;
the plurality of the bearing bodies include a first bearing body that supports the first journal part; and
the recess groove is formed in the bottom surface corner part of the fitting recess part in at least the first bearing body.

8. The internal combustion engine according to claim 7, wherein:
the journal parts include a second journal part;
the at least one weight member includes a second weight member;
the second weight member is disposed at a first end part of the second journal part in an axial direction of the second journal part;
the disk-shaped inertial body is disposed at a second end part of the second journal part in the axial direction of the second journal part;
the plurality of the bearing bodies include a second bearing body that supports the second journal part; and
a second recess groove is formed in the bottom surface corner part of the fitting recess part in the second bearing body.

9. The internal combustion engine according to claim 6, wherein:
the cylinder block has a plurality of the bearing bodies;
the crank shaft has a plurality of journal parts respectively supported by the plurality of the bearing bodies, at least one disk-shaped inertial body configured to stabilize the rotation of the crank shaft, and at least one weight member configured to correct the rotation unbalance of the crank shaft, the journal parts include a second journal part;

the at least one weight member includes a second weight member;

the second weight member is disposed at a first end part of the second journal part in an axial direction of the second journal part;

the disk-shaped inertial body is disposed at a second end part of the second journal part in the axial direction of the second journal part;

the plurality of the bearing bodies include a second bearing body that supports the second journal part; and the recess groove is formed in the bottom surface corner part of the fitting recess part in the second bearing body.

* * * * *